A. GIESECKE.
PROCESS FOR RECOVERING PROTEIN AND PHOSPHATES OF CALCIUM AND MAGNESIUM FROM ACID WASTE WATERS.
APPLICATION FILED MAR. 10, 1919.
1,348,990.
Patented Aug. 10, 1920.
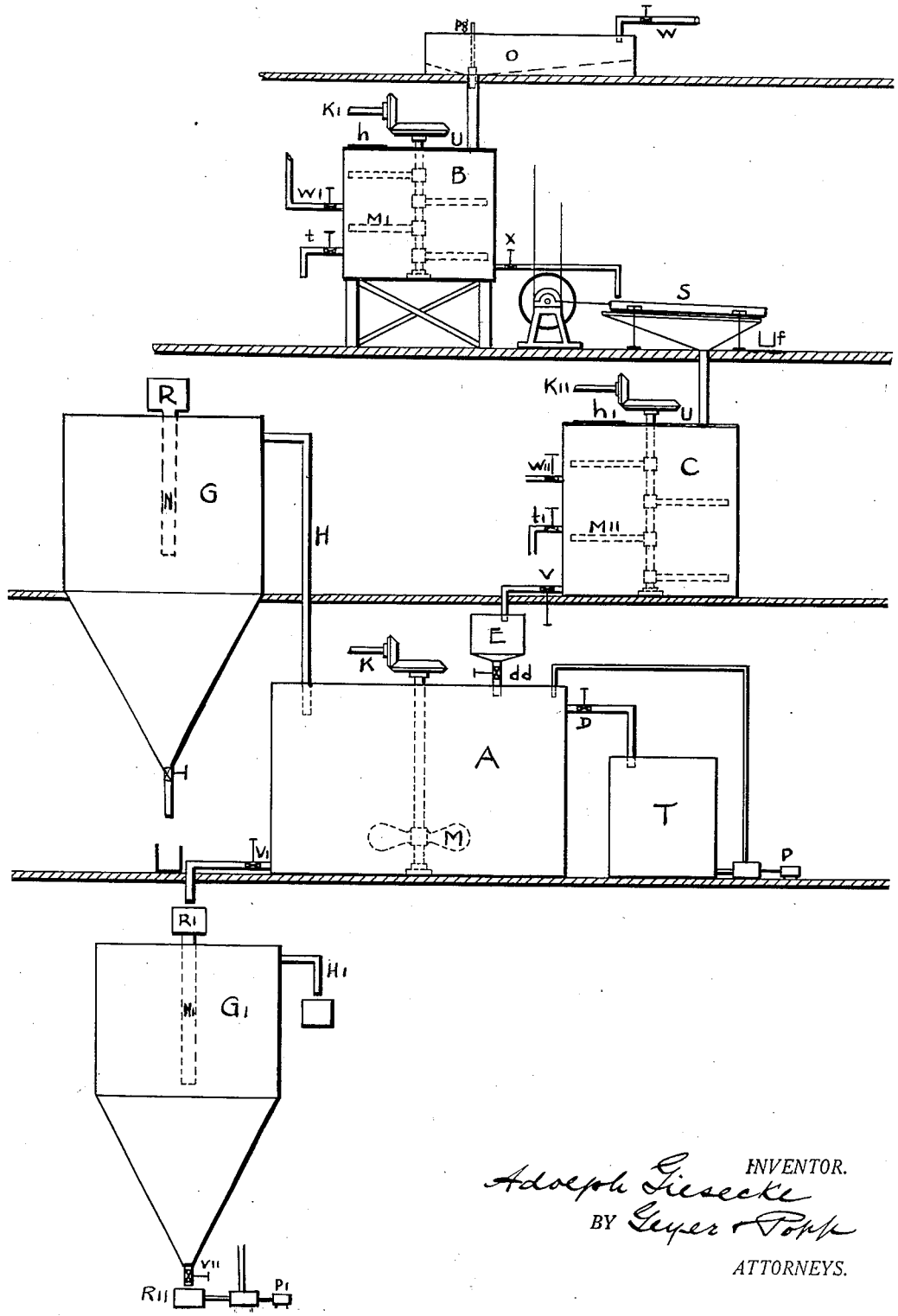

UNITED STATES PATENT OFFICE.

ADOLPH GIESECKE, OF BUFFALO, NEW YORK.

PROCESS FOR RECOVERING PROTEIN AND PHOSPHATES OF CALCIUM AND MAGNESIUM FROM ACID WASTE WATERS.

1,348,990.     Specification of Letters Patent.     Patented Aug. 10, 1920.

Application filed March 10, 1919. Serial No. 281,846.

*To all whom it may concern:*

Be it known that I, ADOLPH GIESECKE, a citizen of the United States, residing at Buffalo, in the county of Erie and State of New York, have invented new and useful Improvements in Processes for Recovering Protein and Phosphates of Calcium and Magnesium from Acid Waste Waters, of which the following is a specification.

My invention relates to the recovery of protein and phosphates of calcium and magnesium from corn steep acid waste waters.

The qualitative chemical analysis of these acid waste waters proves the presence of sulfur dioxid, protein, calcium, magnesium, and phosphoric acid. However this knowledge does not disclose the nature of these waters.

When in these acid waste waters the acidity is determined, calculated as sulfur dioxid, and lime water added, sufficient to form an acid salt, a combination of protein and phosphates of calcium and magnesium precipitates, while the sulfurous acid, combined with calcium to an acid salt, remains in solution. The precipitation ensues on converting the free sulfurous acid into an acid salt, because the change involves a change in physical properties. An acid salt, with physical properties of its own, is the product of the partial neutralization.

Therefore, these acid waste waters represent simple solutions, wherein the combination of protein and phosphates of calcium and magnesium is the solute and sulfurous acid the solvent. If the solvent is converted into an inactive compound, the solute will precipitate.

Moreover, in a sample of the acid waste water, saturated with chlorin gas, chlorin, decomposing the water, combines with the hydrogen to hydrochloric acid, and the oxygen converts the solvent to sulfuric acid. The oxidation of the solvent involves a change in physical properties. The solute precipitates, and that from a solution containing free hydrochloric and sulfuric acid. It is identical with the solute obtained by neutralizing the solvent to an acid salt. In both cases the residue after ignition consists of calcium, magnesium and phosphoric acid.

The sulfurous acid solution of protein and phosphates of calcium and magnesium originates in the process of steeping corn.

On the large scale, corn is steeped in a solution of sulfurous acid at a temperature of 120 degrees Fahrenheit. The fundamental object of steeping corn in this manner is to break up and remove the intercellular substances which consist of organic and inorganic matter, principally protein and phosphates. The sulfurous acid dissolves the protein and the insoluble phosphates are rendered soluble by chemical decomposition. In the course of steeping a great part of the sulfurous acid oxidizes to sulfuric acid which decomposes the phosphates of calcium and magnesium to soluble compounds. As the removal of these intercellular substances gives room for expansion, corn may rise or swell in the course of steeping to 45 per cent. over its original volume. When the steep is finished and the steep liquor drawn off, the kernels retain in their spongy condition a certain part of the steep liquor, and it is this liquor which contains the protein and phosphates as solute and the sulfurous acid as solvent. In the subsequent milling and washing operations an abundance of water is required, and the temperature of that water is far below the steeping temperature. The solute precipitates, because the solvent has lost its strength both by reduction in temperature and dilution. The precipitation of the solute, solely due to physical changes, has brought on a turbidity in the crude starch-milk which, in common parlance, is called a "slimy condition." To relieve the crude starch-milk of this condition the solvent is strengthened by an additional quantity of sulfurous acid which redissolves the solute. Thus, the solute is again in solution, and the refining of starch is thereby facilitated. It is effected by running the crude starch-milk at a certain gravity and proper speed over inclined trough-like planes, called tables. The bulk of starch settles on the tables, and the "tailings" run from the outlet of the tables in wooden trough R, trough pipe N into settler G which represents the regular gluten settler. It is employed in actual practice for the purpose of separating the solid substances of the tailings from the bulk of acid water. The solid substances which accumulate in the cone pass out with water in a physically condensed state and are worked up into a feed product known in commerce as gluten-meal. The acid water rises to an overflow-pipe and represents the acid waste water, hereinbefore referred to. I depart from the customary procedure by running the acid waste water through pipe H into a tank, hereinafter described as tank A.

The object of my invention is to produce from the acid waste water a fertilizing compound of protein and phosphates of calcium and magnesium, and it consists of the process of neutralizing the free acid of said waste water with milk of lime to an acid calcium salt, my invention being based upon the discovery that when the free acid is neutralized to an acid salt a precipitation is effected and that the product thereby obtained from the acid salt solution consists of protein and phosphates of calcium and magnesium.

The accompanying drawing represents a diagrammatic elevation of a suitable apparatus for carrying out my invention.

A represents a neutralizing-tank, wherein the acid of a given volume of acid wastewater is neutralized by milk of lime to an acid salt. The milk of lime is thoroughly mixed with the acid waste water by the propeller-wheel M, receiving its movement from the power driven shaft K.

When the acid waste water in tank A overflows into receiver T the supply is shut off, and as soon as said acid waste water reaches its lowest level in tank A, valve D is closed. Said acid waste water is now a measured volume, conveniently 3500 gallons. The overflow-water in receiver T may be occasionally forced back into tank A by pump P.

The acidity of the acid waste water depends on the gravity at which the crude starch-milk is admitted to the tables. If in the acid waste water a standard of acidity is once established, it is essential to maintain it. This may be accomplished by aid of frequent determinations. If said acid waste water has an acid content of 0.64 grams per liter, calculated as sulfur dioxid, 3500 gallons, being equal to 13247 liters, contain 18.69 pounds of sulfur dioxid.

The definite amount of sulfur dioxid requires for neutralization to an acid salt a definite amount of calcium oxid. To neutralize 64 pounds of sulfur dioxid in solution to an acid calcium salt 28 pounds of calcium oxid are required. Hence 18.69 pounds need:—

$64 : 28 :: 18.69 : x$ $x = 8.17$ pounds of calcium oxid.

The milk of lime is prepared from a quick-lime which is known to make a "fat lime" with water. The quick-lime is put into box O and slaked with about a third of its weight of water. The calcium oxid of the quick-lime absorbs the water with violence and at a ratio of 56 to 18, whereby calcium hydroxid is formed which crumbles to a white amorphous powder.

B and C represent tanks wherein the milk of lime is prepared by agitators $M^1$ and $M^{11}$, receiving their movement from power driven shafts $K^1$ and $K^{11}$, respectively. As calcium hydroxid absorbs carbon dioxid from the air, tanks B and C are fitted with heavy wooden covers U, and openings $h$, $h^1$ are covered with suitable boards. S represents a flat vibrating sieve of well known construction, covered with 80 mesh brass wire-cloth. Measuring tank E is supplied from tank C with the quantity of milk of lime requisite for neutralizing to an acid salt the acid present in the waste water of tank A.

The agitators $M^1$ and $M^{11}$ together with sieve S are next set into motion. From pipe W water is added to the slaked lime in box O, and when the mixture has attained by proper manipulation a semi-fluid consistence, plug $Pg$ is removed, and the mixture run into tank B simultaneously with water from pipe $W^1$. To ascertain the gravity of the milk of lime, the water is shut off, and a sample drawn from cock $t$ is tested with Baumé's hydrometer. If, in the first instance, the test shows a gravity of 20 degrees Baumé, a limited volume of water is added, and when thoroughly mixed with the milk of lime, the hydrometer-test is repeated. This procedure is continued until a gravity of 12 degrees Baumé is obtained. At this gravity the milk of lime is conducted to sieve S by opening valve $x$. The coarse foreign substances together with lumpish particles of calcium hydroxid are retained, while the milk of lime passes through the meshes of the sieve in an homogeneous and refined condition and collects in tank C. The gravity of the refined milk of lime which may now be below 12 degrees Baumé is further reduced to 10 degrees Baumé by adding the proper quantity of water from pipe $W^{11}$.

Pure milk of lime at a gravity of 10 degrees Baumé and at 60 degrees Fahrenheit contains 8.74 per cent. of calcium oxid, according to Lunge and Blattner's table. The quantity of the refined milk of lime, requisite for neutralizing 18.69 pounds of sulfur dioxid to an acid calcium salt, depends on its purity. If it is found by volumetric analysis that 10 grams of the refined milk of lime contain 0.817 gram calcium oxid 100 pounds of said milk of lime accomplish the neutralization.

At this juncture the propeller-wheel M in tank A is next set into motion by power driven shaft K. Valve V is opened, and 100 pounds of milk of lime are drawn from tank C into measuring-tank E. Thereupon valve *dd* is opened, and the measured quantity of milk of lime is admitted into the measured volume of acid waste water in tank A. When the milk of lime is dissolved and the acid present in the waste water neutralized to an acid salt, the combination of protein and phosphates of calcium and magnesium precipitates forthwith.

The subsequent process of making from the solids in tank A a marketable fertilizing compound is identical with the process of working up the solids of the tailings into common gluten meal. The mixture of solids and water in tank A is conducted by opening valve $V^1$ to wooden trough $R^1$ and from thence through pipe N into settler $G^1$. The solids of the mixture, being heavier than water, accumulate in the cone and pass out with water in a physically condensed state, the flow of which is regulated by valve $V^{11}$. The water rises by continuous feeding and flows off through pipe $H^1$. The mixture of condensed solids and water is forced from wooden trough $R^{11}$ by pump $P^1$ through filter-presses, the press-cake reduced to dryness and ground.

I claim as my invention:

1. The precipitation of a combination of protein and phosphates of calcium and magnesium from corn steep acid waste waters by partially neutralizing the solvent with milk of lime.

2. The precipitation of a combination of protein and phosphate of calcium and magnesium from corn steep acid waste waters by partially neutralizing the solvent with an homogeneous milk of lime.

ADOLPH GIESECKE.